United States Patent
Gensler, Jr. et al.

(10) Patent No.: US 10,001,926 B2
(45) Date of Patent: *Jun. 19, 2018

(54) MANAGEMENT OF EXTENTS FOR SPACE EFFICIENT STORAGE VOLUMES BY REUSING PREVIOUSLY ALLOCATED EXTENTS

(71) Applicant: INTERNATIONAL BUSINESS MACHINES CORPORATION, Armonk, NY (US)

(72) Inventors: Robert S. Gensler, Jr., Beavercreek, OH (US); Lisa J. Gundy, Tucson, AZ (US); Christopher J. Miller, Tucson, AZ (US); Jeffrey R. Suarez, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/488,105

(22) Filed: Apr. 14, 2017

(65) Prior Publication Data

US 2017/0220263 A1    Aug. 3, 2017

Related U.S. Application Data

(63) Continuation of application No. 14/617,613, filed on Feb. 9, 2015, now Pat. No. 9,658,773.

(51) Int. Cl.
G06F 12/00    (2006.01)
G06F 3/06    (2006.01)

(52) U.S. Cl.
CPC .......... *G06F 3/0608* (2013.01); *G06F 3/0631* (2013.01); *G06F 3/0644* (2013.01);
(Continued)

(58) Field of Classification Search
CPC .... G06F 3/0608; G06F 3/0631; G06F 3/0644; G06F 3/0662; G06F 3/0665; G06F 3/0683
See application file for complete search history.

(56) References Cited

U.S. PATENT DOCUMENTS 6,675,268 B1    1/2004    DeKoning et al.
8,046,543 B2    10/2011    Loebach
(Continued)

OTHER PUBLICATIONS

U.S. Appl. No. 14/617,581, filed Feb. 9, 2015.
(Continued)

*Primary Examiner* — Shawn X Gu
(74) *Attorney, Agent, or Firm* — Rabindranath Dutta; Konrad Raynes Davda & Victor LLP

(57) ABSTRACT

A storage controller maintains an allocation space for extent space efficient storage volumes, in response to a request from a host application for storage space, wherein an extent pool is configured to allocate available extents to the host application. In response to a request from the host application to delete data stored in selected extents that are already allocated to the host application, the storage controller deletes the data but continues to maintain the selected extents as being allocated to the host application. In response to a request to write new data, the storage controller writes the new data to the selected extents that are already allocated.

18 Claims, 10 Drawing Sheets

(52) U.S. Cl.
CPC .......... *G06F 3/0662* (2013.01); *G06F 3/0665* (2013.01); *G06F 3/0683* (2013.01); *G06F 3/0689* (2013.01)

(56) References Cited

U.S. PATENT DOCUMENTS

| | | |
|---|---|---|
| 8,239,648 B2 | 8/2012 | Goebel et al. |
| 9,632,704 B2 | 4/2017 | Gensler, Jr. |
| 9,658,773 B2 | 5/2017 | Gensler, Jr. |
| 2006/0184720 A1* | 8/2006 | Sinclair ............... G06F 12/0246 711/103 |
| 2007/0260842 A1 | 11/2007 | Faibish et al. |
| 2011/0208924 A1* | 8/2011 | Kakui ................... G06F 3/0608 711/154 |
| 2012/0233434 A1* | 9/2012 | Starks ................... G06F 3/0644 711/170 |
| 2014/0185314 A1 | 7/2014 | Schattinger et al. |
| 2016/0231934 A1 | 8/2016 | Gensler, Jr. et al. |
| 2016/0231946 A1 | 8/2016 | Gensler, Jr. et al. |

OTHER PUBLICATIONS

Office Action dated Aug. 26, 2016, pp. 14 for U.S. Appl. No. 14/617,581, filed Feb. 9, 2015.
Response dated Nov. 23, 2016, pp. 10, to Office Action dated Aug. 26, 2016, pp. 14 for U.S. Appl. No. 14/617,581, filed Feb. 9, 2015.
Notice of Allowance dated Dec. 16, 2016, pp. 9, for U.S. Appl. No. 14/617,581, filed Feb. 9, 2015.
U.S. Appl. No. 14/617,613, filed Feb. 9, 2015.
Office Action dated Sep. 8, 2016, pp. 15, for U.S. Appl. No. 14/617,613, filed Feb. 9, 2015.
Response dated Dec. 8, 2016, pp. 9, to Office Action dated Sep. 8, 2016, pp. 15, for U.S. Appl. No. 14/617,613, filed Feb. 9, 2015.
Notice of Allowance dated Jan. 19, 2017, pp. 13 for U.S. Appl. No. 14/617,613, filed Feb. 9, 2015.
U.S. Appl. No. 15/461,245, filed Mar. 16, 2017.
List of IBM Patents or Patent Applications Treated as Related, dated Mar. 16, 2017, pp. 2.

* cited by examiner

MANAGEMENT OF EXTENTS FOR SPACE EFFICIENT STORAGE VOLUMES BY REUSING PREVIOUSLY ALLOCATED EXTENTS

CROSS-REFERENCE TO RELATED APPLICATION

This application is a continuation of U.S. patent application Ser. No. 14/617,613, filed Feb. 9, 2015, which application is incorporated herein by reference in its entirety.

BACKGROUND

1. Field

Embodiments relate to the management of extents for space efficient storage volumes by reusing previously allocated extents.

2. Background

A storage controller may be coupled to one or more of a plurality of hosts. The storage controller may manage a plurality of storage devices, such as disk drives, tape drives, etc., that are coupled to the storage controller. The plurality of hosts may access data stored in the storage devices via the storage controller.

The storage volumes stored in the storage devices may be maintained as space efficient storage volumes. In space efficient storage volumes, the storage volumes may be thinly provisioned which means that physical storage space is not allocated to the storage volumes until a write to the storage volumes requires the space. The amount of space that is allocated is based on the amount of data that is written to the storage volumes. In space efficient storage volumes, the logical space defined for the storage volumes exceeds the physical space allocated to the storage volumes.

In space efficient storage volumes, the space for the storage volumes are allocated when the write operations actually write tracks, extents, blocks, or other storage units to the storage volumes. If the unit for storing data is an extent, then the space efficient storage volumes are referred to as extent space efficient storage volumes.

SUMMARY OF THE PREFERRED EMBODIMENTS

Provided are a method, a system, and a computer program in which a storage controller maintains an allocation space for extent space efficient storage volumes, in response to a request from a host application for storage space, wherein an extent pool is configured to allocate available extents to the host application. In response to a request from the host application to delete data stored in selected extents that are already allocated to the host application, the storage controller deletes the data but continues to maintain the selected extents as being allocated to the host application. In response to a request to write new data, the storage controller writes the new data to the selected extents that are already allocated.

In additional embodiments, the selected extents were previously allocated to the host application, in response to a previous request from the host application to write the data whose deletion is being requested.

In further embodiments, a request is received to write additional new data. A determination is made that an adequate number of allocated extents are unavailable for writing the additional new data. Additional extents are allocated from the extent pool to the host application, to write the additional new data.

In yet further embodiments, a determination is made that extents available in the extent pool have fallen below a threshold number. One or more extents are released from the allocation space to add to the extent pool, wherein the one or more extents are not storing valid data.

In further embodiments, a determination is made that a predetermined period of time has elapsed since the data was deleted. The selected extents are released to add to the extent pool, in response to determining that the predetermined period of time has elapsed since the data was deleted.

In certain embodiments, the allocation space is allocated to the host application, by the storage controller, for use by the host application.

In further embodiments, the extent pool is comprised of extents physically stored in one or more storage devices coupled to the storage controller.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Technical Problem in Space Efficient Volumes

In certain disk storage systems, thin provisioning may be used. Thin provisioning uses a type of space efficient volume referred to as Extent Space Efficient (ESE) volumes. Physical storage for ESE volumes is allocated from the extent pool one extent at a time, when the physical space is needed, rather than being full allocated (i.e., fully provisioned) up front at configuration time. The ESE volumes may be defined up to the maximum size allowed by the system and the storage controller. As data is written, the storage subsystem may allocate physical space to the ESE volume in pre-defined extents. When data is deleted, and the operating system software notifies the storage subsystem that the storage is no longer needed, the physical space may be released back to the extent pool, available to be used by other ESE volumes.

A significant problem introduced by ESE volumes, especially with the use of batch jobs that utilize temporary datasets, is the potential for thrashing as a dataset is written and deleted, and as another dataset is written and deleted, potentially to the same ESE volume. So, an extent may be allocated, released to the extent pool, and then a host initiated write may substantially immediately be directed to the same volume and physical location that was released. This thrashing may negatively impact the storage subsystem performance when using ESE volumes. Certain embodiment are directed towards reducing the possibility of thrashing when extent space efficient storage volumes are used. Also, certain embodiments are directed towards improving the performance of a storage controller by reusing extents whose data has been deleted, where the extents to be reused have yet to be released from an allocation space to the extent pool.

Exemplary Embodiments

Figure 1:
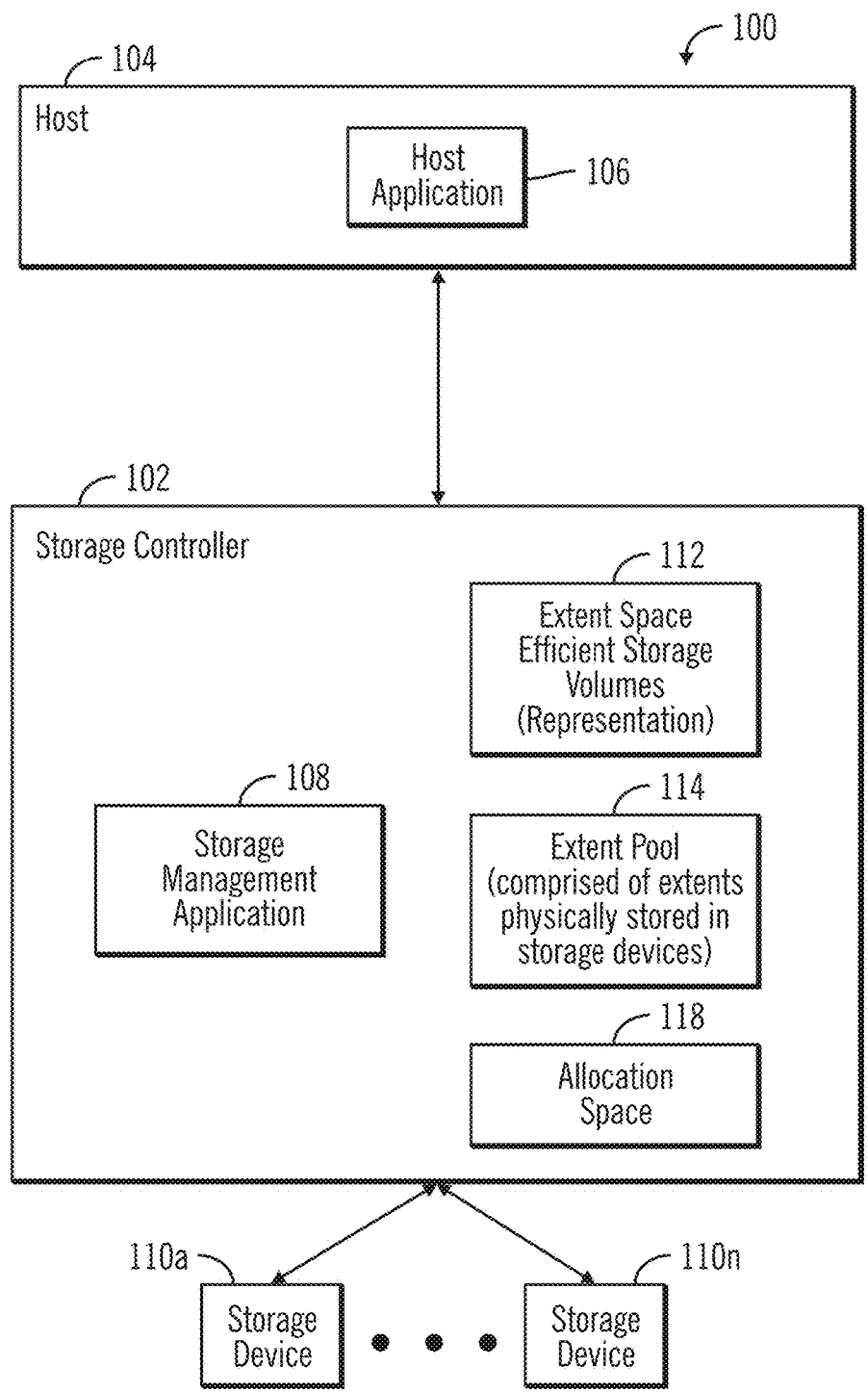
FIG. 1 illustrates a block diagram of a computing environment comprising a storage controller coupled to a host, in accordance with certain embodiments.

FIG. 1 illustrates a block diagram of a computing environment 100 comprising a storage controller 102 coupled to a host 104 via a network or a direct link, in accordance with certain embodiments.

The storage controller 102 and the host 104 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102 and the host 104 may be elements in any suitable network, such as, a storage area network, a wide area network, the Internet, an intranet. In certain embodiments, storage controller 102 and the host 104 may be elements in a cloud computing environment.

In certain embodiments, the storage controller 102 is coupled to the host 104 via a suitable network such as the Internet, an intranet, a storage area network, etc. A host application 106 executes in the host 104 and a storage management application 108 executes in the storage controller 102, where the host application 106 and the storage management application 108 may be implemented in software, hardware, firmware or any combination thereof.

The storage controller 102 controls access to one or more storage devices 110a . . . 110n that are coupled to the storage controller 102. The storage devices 110a . . . 110n may include any suitable storage devices such as magnetic disk drives, tape drives, solid state drives, etc.

In certain embodiments, the storage management application 108 that executes in the storage controller 102 maintains data physically in the storage devices 110a . . . 100n, and maintains the data logically in extent space efficient storage volumes 112. The storage management application 108 maintains an extent pool 114 that is comprised of extents physically stored in one or more of the storage devices 110a . . . 110n.

The host application 106 may generate a space allocation request prior to space being allocated for the host application 106. It should be noted that the space allocation request is generated via operations in which the host application 106 requests allocation of a logical volume to the storage controller 102, where the host application 106 may at a subsequent time write to or read from logical addresses corresponding to the allocated logical volume. On receiving the space allocation request from the host application 106, the storage controller 102 generates an extent space efficient storage volume 112 for the host application 106. When extents are allocated for the extent space efficient storage volume 112, the extents are taken from the extent pool 114. Therefore, the storage controller 102 constructs a logical volume as an extent space efficient storage volume 112 from physical extents managed within the extent pool 114. The physical extents managed by the extent pool 114 are physically stored in the physical storage devices 110a . . . 110n. Therefore, the host application 106 reads from or writes to a logical volume that does not have physical storage allocated until the host application 106 writes to the logical volume, and then one or more extents are assigned from the extent pool 114 to the logical volume. The allocation space 118 shown in FIG. 1 corresponds to the space allocated to the extent space efficient storage volume 112.

If the host application 106 fluctuates in adding and removing datasets, thrashing of extents may happen. Certain embodiments provides a policy handler in the storage management application 108 that incorporates a delay in the release of extents from the allocation space 118. This delay may hold some extents of the allocation space 118 in place for the host application 106 to ensure that the extents of the allocation space 118 do not immediately return to the extent pool 114 for being available to other applications, and as a result avoids thrashing of extents. Additionally, when additional writes requests are received by the storage controller 102 from the host application 108, already allocated extents that have deleted data but that have not yet been returned to the extent pool 114 may be reused for writing the data corresponding to the additional write requests and this may improve the performance of the storage controller 102.

In addition to keeping the allocation space 118 for the host application 106, a cleanup procedure may follow to ensure there are no orphaned extents in the allocation space 118 when data is deleted. During the cleanup procedure, the allocation space 118 may be flagged or marked as "soft released", i.e., the extents of the allocation space 118 are available to the extent pool 114 but not yet released from the allocation space 118. When a threshold delay expires or when space is needed by the extent pool 114, the release of the empty extents of the allocation space 118 sends the empty extents back to the extent pool 114. In addition, when space is soft-released and not reused within the delay period, the storage controller 102 may automatically mark that space as a candidate to be commit-released, or permanently released.

Therefore, in certain embodiments, when a space release request is initiated on a thin provisioned volume (e.g., via a deletion of data requested from the host application 106 to the storage controller 102), the physical space for the thin provisioned volume allocated in the extent pool 114 is in an indeterminate state until the storage subsystem comprised of the storage controller 102 and the storage devices 110a . . . 110n actually releases the space to the extent pool 114.

Making the storage management application 108 aware of all states of extents in the extent pool (allocated, unallocated but not yet physically freed, and unallocated and physically freed) allows the storage management application 108 to select space for a write. Certain embodiments obtain volume allocation information via a new query. Then, the storage management application 108 determines what space may be unallocated but not yet physically freed in the extent pool 114 and select that space to perform the write. This process when combined with a small delay in the microcode between the request to free space and the actual freeing of the physical space may alleviate potential thrashing that may occur within am extent pool when there is a lot of allocate and delete processing occurring, such as during a nightly batch process, a database reorganization, or processes that require the allocation and deletion of temporary datasets.

Figure 2:
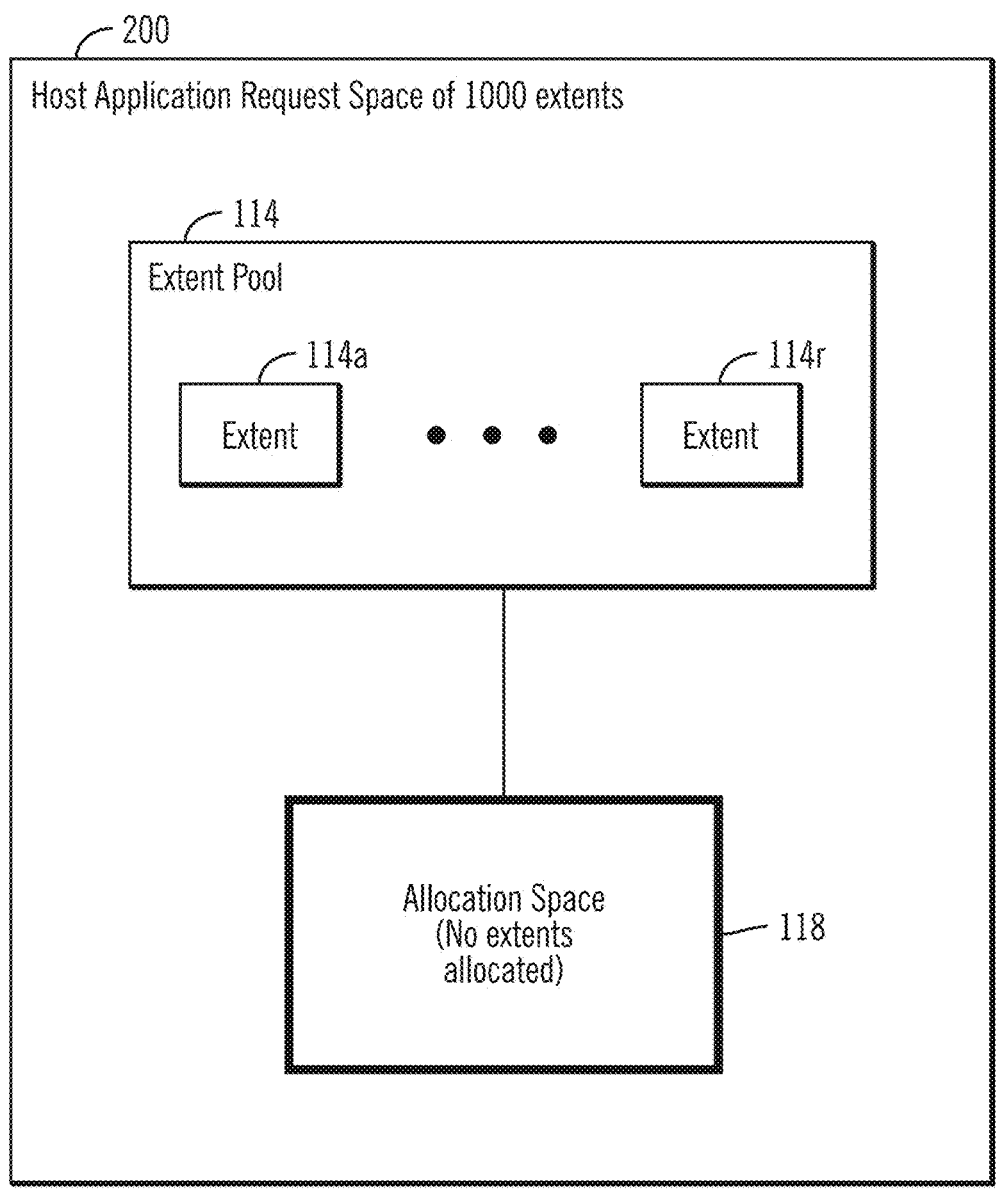
FIG. 2 illustrates a block diagram that shows how a host application requests space amounting to a 1000 extents, in accordance with certain embodiments.

FIG. 2 illustrates a block diagram 200 that shows how a host application 106 requests space amounting to a 1000 extents (or some other number of extents), in accordance with certain embodiments. It should be noted that in other embodiments space amounting to a different number of extents may be requested by the host application 106.

In FIG. 2, the extent pool 114 may be comprised of a plurality of extents 114a . . . 114r, where one or more of the plurality of extents 114a . . . 114r may be allocated, unallocated but not yet physically freed, and unallocated and physically freed.

When the host application 106 requests space amounting to a 1000 extents (e.g., by requesting a logical volume with a certain amount of space), the storage management application 108 may indicate to the host application 106 that an allocation space 118 comprising a 1000 extents has be reserved for the host application 106. However, because of thin-provisioning the storage management application 108 does not actually allocate extents to the allocation space 118 until a write request is received from the host application 106.

Figure 3:
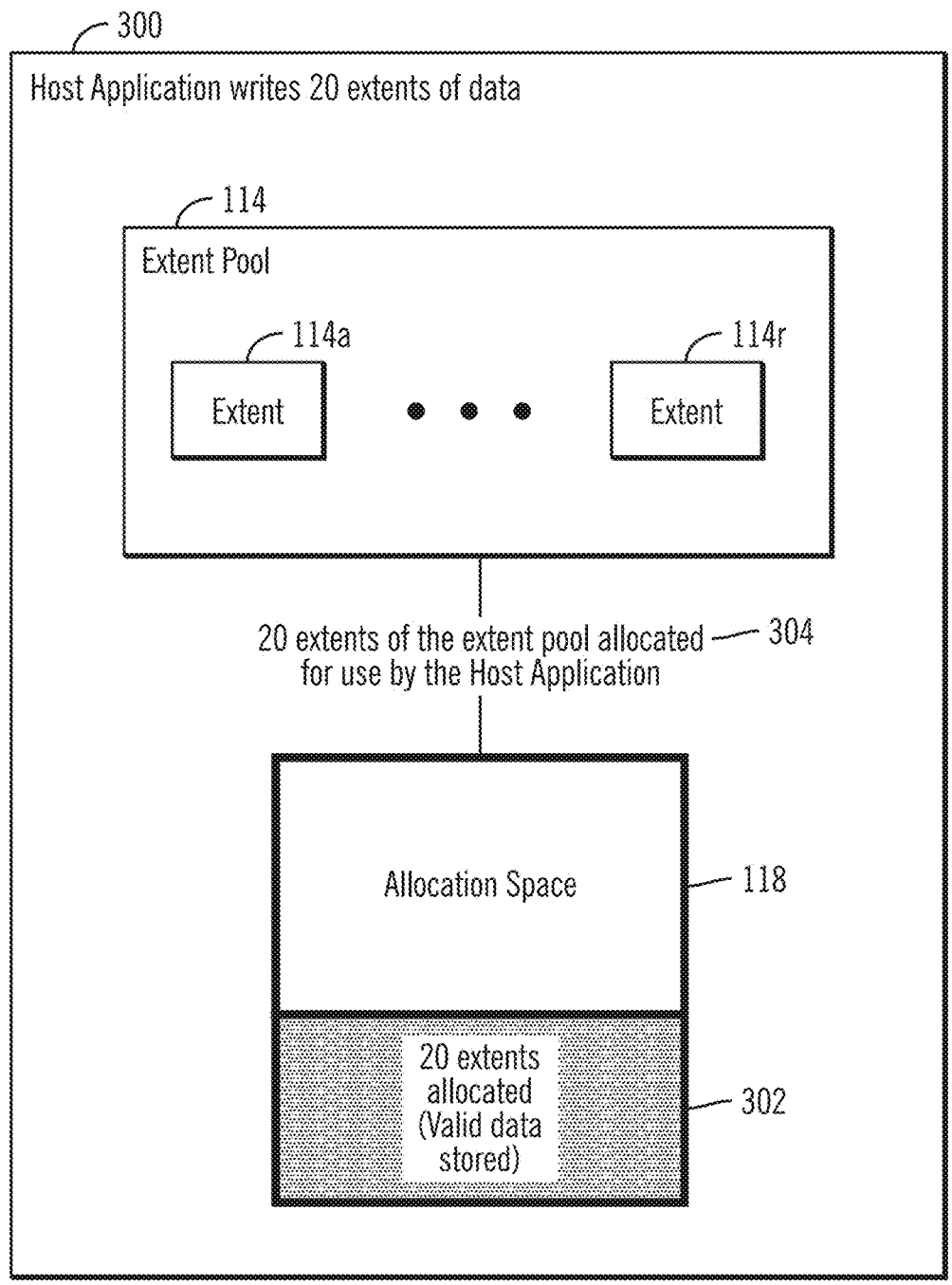
FIG. 3 illustrates a block diagram that shows how the host application writes 20 extents of data, in accordance with certain embodiments.

FIG. 3 illustrates a block diagram 300 that shows how the host application 106 writes 20 extents of data (e.g., by writing to logical addresses), in accordance with certain embodiments. It should be noted that that a 1000 extent allocation space 118 has already been indicated but not yet allocated for the host application 106 (as shown in FIG. 2). Instead of 20 extents of data, a different number of extents of data may be written by the host application 106.

The storage management application 108 receives the request to write 20 extents of data, and the storage management application 108 allocates 20 extents from the extent pool 114 to the allocation space 118 as shown by reference numeral 302. Data is written to these 20 extents (reference numeral 302), i.e., valid data is stored in these 20 extents (reference numeral 302). Thus 20 extents of the extent pool 114 are allocated for use by the host application 106 (as shown via reference numeral 304, 302).

Figure 4:
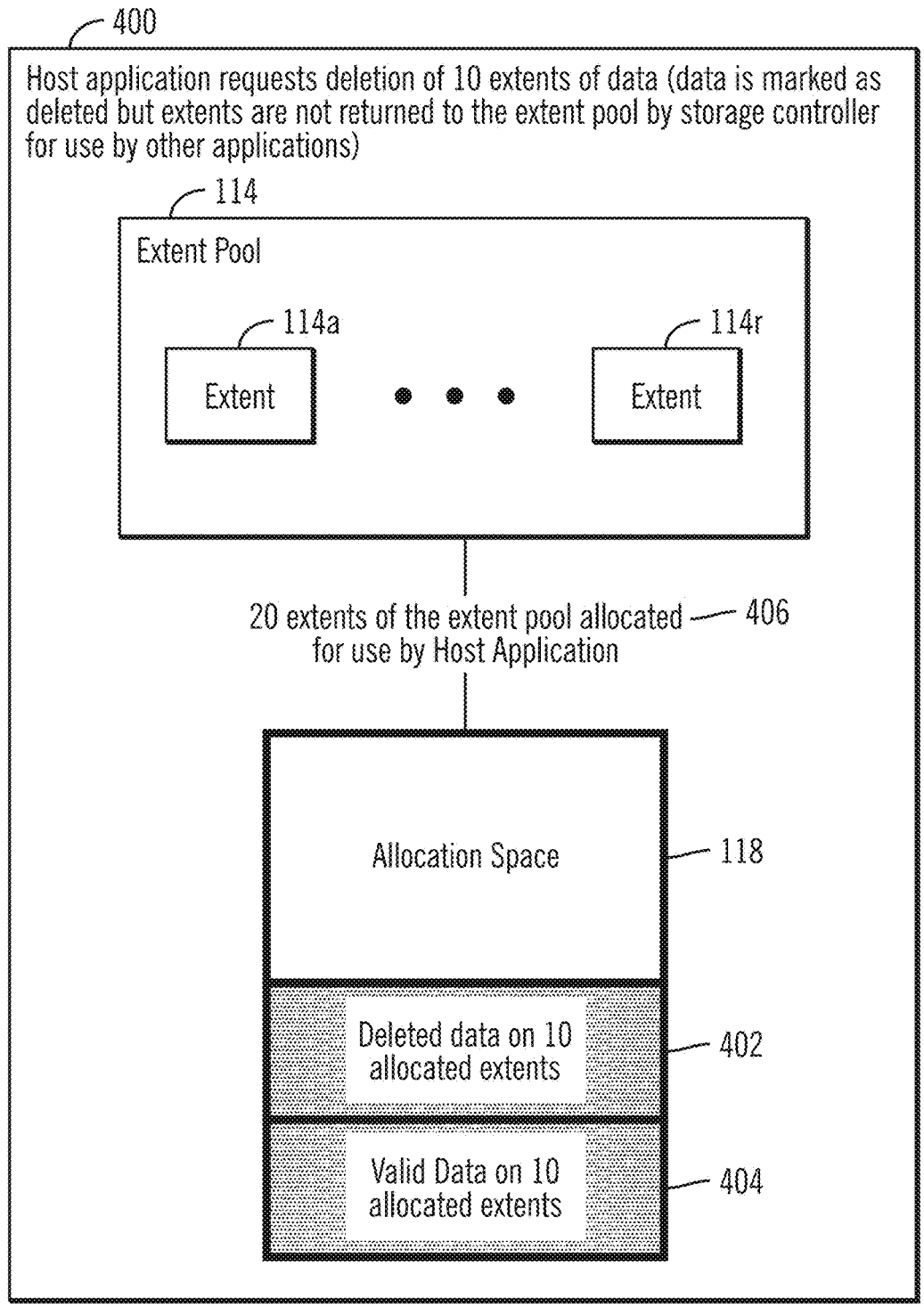
FIG. 4 illustrates a block diagram that shows how the host application deletes 10 extents of data, in accordance with certain embodiments.

FIG. 4 illustrates a block diagram 400 that shows how the host application 106 deletes 10 extents of data (e.g., by deleting data from logical addresses), in accordance with certain embodiments. In alternative embodiments, a different number of extents of data may be deleted.

It should be noted that in FIG. 3, 20 extents of data were allocated in the allocation space, and on receipt of the request to delete 10 extents of data, the storage management application 108 deletes the data on the 10 extents, but does not release (i.e., deallocate) the extents from the allocation space 118 to the extent pool 114 for use by other applications. As a result, deleted data 402 is found in 10 allocated extents of the allocation space 118, and valid data (i.e., previously written and still valid) 404 may be found in the remaining 10 allocated extents. Therefore, 20 extents of the extent pool 114 are still allocated for use by the host application 106, even though data in 10 of the 20 extents have been deleted (as shown via reference numerals 402, 404, 406).

Figure 5:
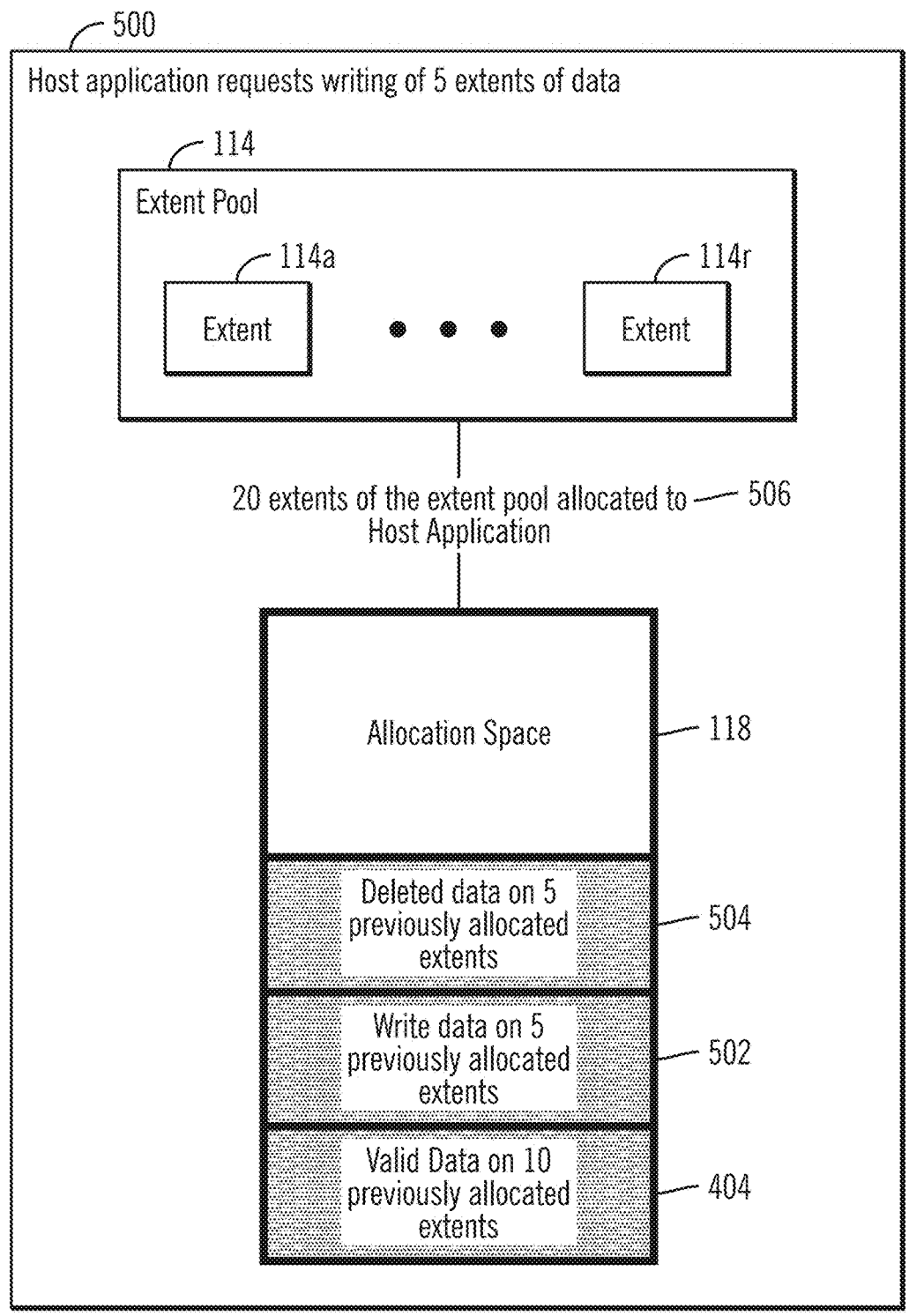
FIG. 5 illustrates a block diagram that shows how the host application requests writing of 5 extents of data, in accordance with certain embodiments.

FIG. 5 illustrates a block diagram 500 that shows how the host application 106 requests the writing of 5 extents of data (e.g., by writing data to logical addresses), in accordance with certain embodiments, subsequent to the deletion of the 10 extents of data as shown earlier in FIG. 4.

Since 10 extents contained deleted (i.e., invalid) data but were still allocated, 5 of these 10 extents are used for writing the 5 extents of data as shown via reference numeral 502, and deleted (i.e., invalid) data is found in the remaining 5 extents 504. Therefore, 20 extents of the extent pool 114 are still allocated for use by the host application 106, even though data in 5 of the 20 extents have been deleted (as shown via reference numerals 502, 504, 506, 404). At a future point in time, the 5 extents with deleted data (reference numeral 504) may be released to the extent pool 114, in response to an expiry of a predetermined amount of time, or in response to available extents for use by other applications falling below a predetermined threshold in the extent pool 114.

Figure 6:
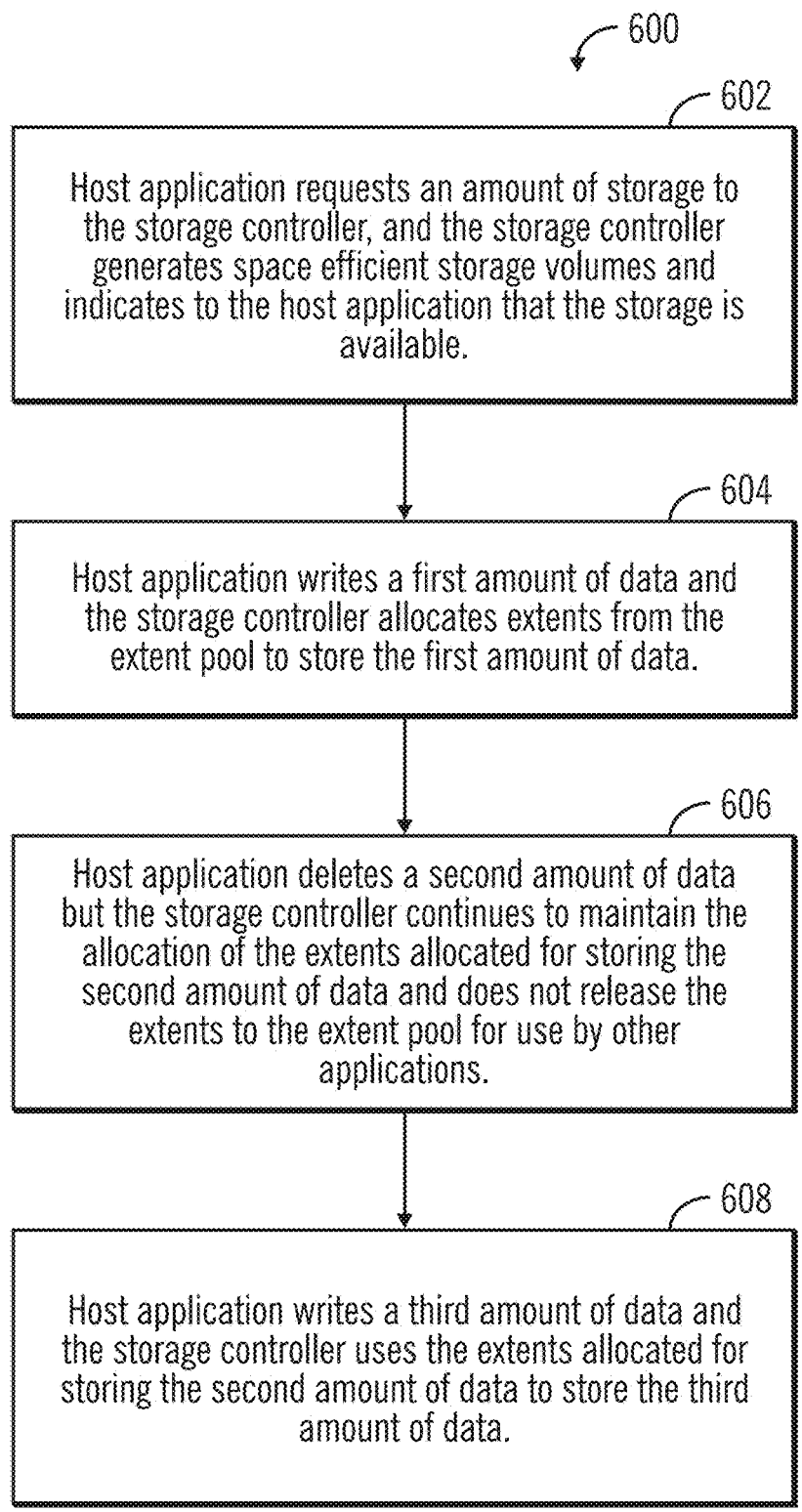
FIG. 6 illustrates a first flowchart that shows operations performed for managing space efficient storage volumes, in accordance with certain embodiments.

FIG. 6 illustrates a first flowchart 600 that shows operations performed for managing space efficient storage volumes, in accordance with certain embodiments. The operations shown in FIG. 6 are performed by the storage controller application 108 and/or the host application 106.

Control starts at block 602 in which the host application 106 requests an amount of storage (e.g. 1000 extents as shown in FIG. 2) to the storage controller 102, and the storage controller 102 generates space efficient storage volumes 112 and indicates to the host application 106 that the storage is available.

Control proceeds to block 604 in which the host application 106 writes a first amount of data (e.g., 20 extents of data as shown in FIG. 3) and the storage controller 102 allocates extents from the extent pool 114 to store the first amount of data. Then, the host application 106 deletes a second amount of data (e.g. 10 extents of data as shown in FIG. 4) but the storage controller 102 continues to maintain the extents allocated for storing the second amount of data and does not release the extents to the extent pool 114 for use by other applications (as shown by reference numeral 606).

Control proceeds to block 608 in which the host application 106 writes a third amount of data (e.g., 5 extents of data as shown in FIG. 5) and the storage controller uses at least some of the extents allocated for storing the second amount of data to store the third amount of data.

Therefore, FIG. 6 illustrates certain embodiments in which extents are not deallocated from the allocation space 118 even when data is deleted. The extents that are not deallocated may be reused on subsequent write requests, and as a result thrashing is avoided.

Figure 7:
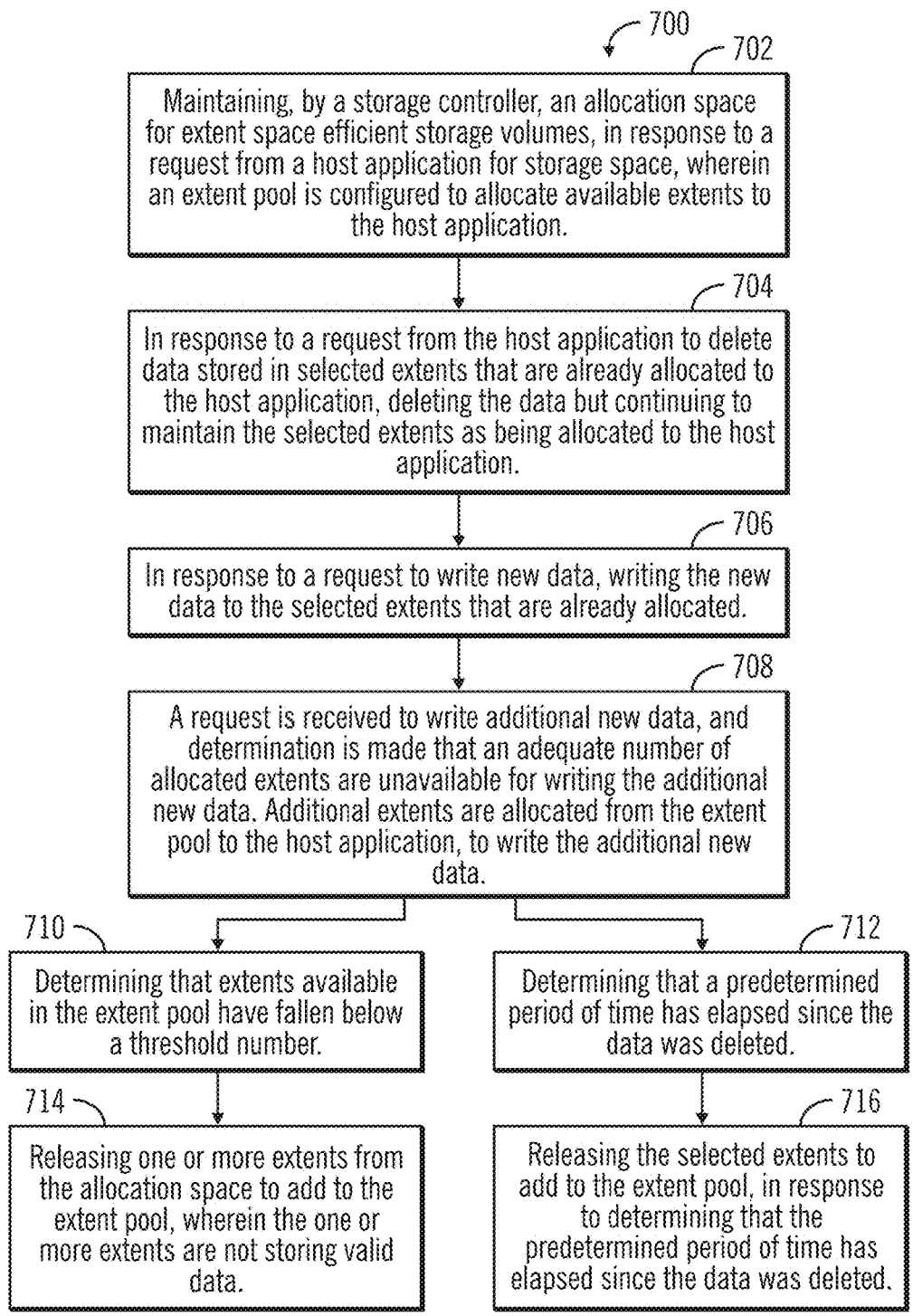
FIG. 7 illustrates a second flowchart that shows operations performed for managing space efficient storage volumes, in accordance with certain embodiments.

FIG. 7 illustrates a second flowchart 700 that shows operations performed for managing space efficient storage volumes, in accordance with certain embodiments. The operations shown in FIG. 7 are performed by the storage controller application 108 and/or the host application 106.

Control starts at block 702 in which a storage controller 102 maintains an allocation space for extent space efficient storage volumes, in response to a request from a host application 106 for storage space, wherein an extent pool is configured to allocate available extents to the host application 106.

In response to a request from the host application 106 to delete data stored in selected extents that are already allocated to the host application 106, the storage controller 102 deletes the data but continues to maintain the selected extents as being allocated to the host application 106 (as shown via reference numeral 704). In response to a request to write new data, the storage controller 102 writes (at block 706) the new data to the selected extents that are already allocated.

Control proceeds to block 708 in which a request is received to write additional new data. A determination is made that an adequate number of allocated extents are unavailable for writing the additional new data. Additional extents are allocated from the extent pool to the host application 106, to write the additional new data (reference numeral 708).

From block 708 control may proceed to blocks 710 and 712 in parallel. At block 710, a determination is made that extents available in the extent pool 114 have fallen below a threshold number. One or more extents are released (at block 714) from the allocation space 118 to add to the extent pool 114, wherein the one or more extents are not storing valid data (i.e., the data in the one or more extents has been deleted).

At block 712, a determination is made that a predetermined period of time has elapsed since the data was deleted. The selected extents are released (at block 716) to add to the extent pool 114, in response to determining that the predetermined period of time has elapsed since the data was deleted.

Therefore, FIGS. 1-7 illustrate certain embodiments in which a delay is created in the release of extents from an allocation space 118 when thin provisioned storage volumes are used, in order to prevent thrashing. Extents that are empty in the allocation space 118 are not released until needed by the extent pool 114 to provide to other applications or until a predetermined amount of time has elapsed such that the possibility of thrashing is remote. Additionally, the extents that are empty in the allocation space 118 of the host application 108 are reused for additional write requests that may be generated by the host application 106, and this may improve the performance of the storage controller 102 over situations were new extents have to be allocated from the extent pool 114 for the host application 106 for performing the additional write requests.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
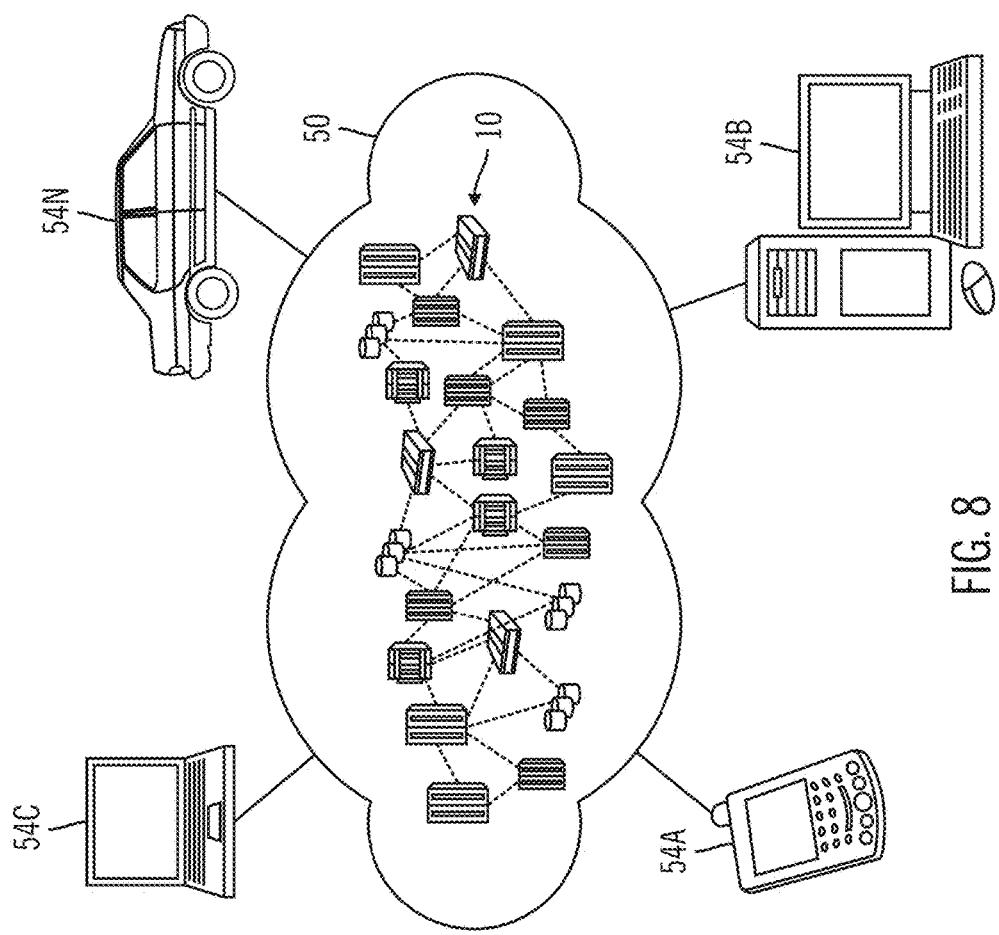
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
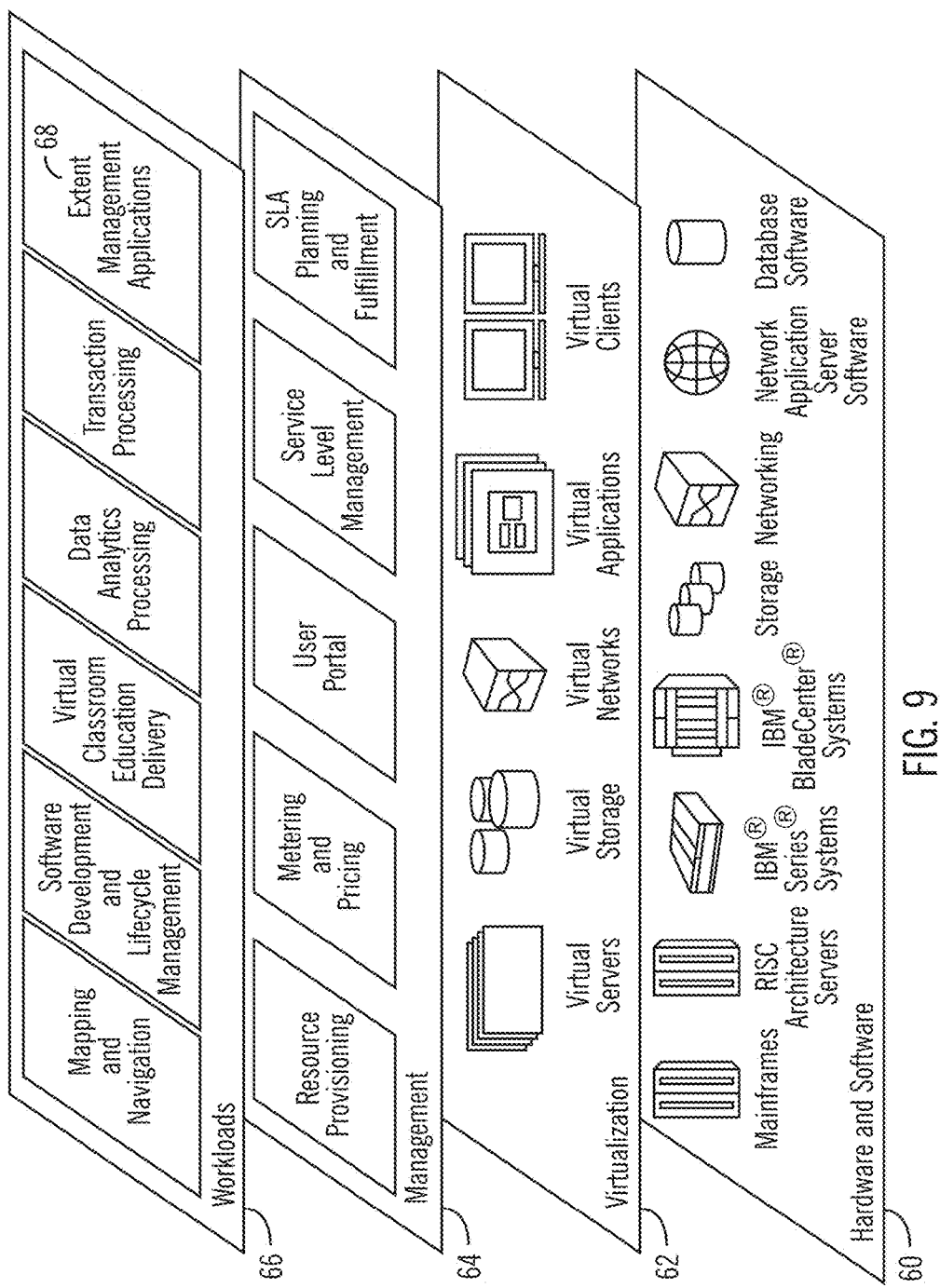
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the extent management applications 68 (e.g., the storage management application 108 and the host application 106) as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
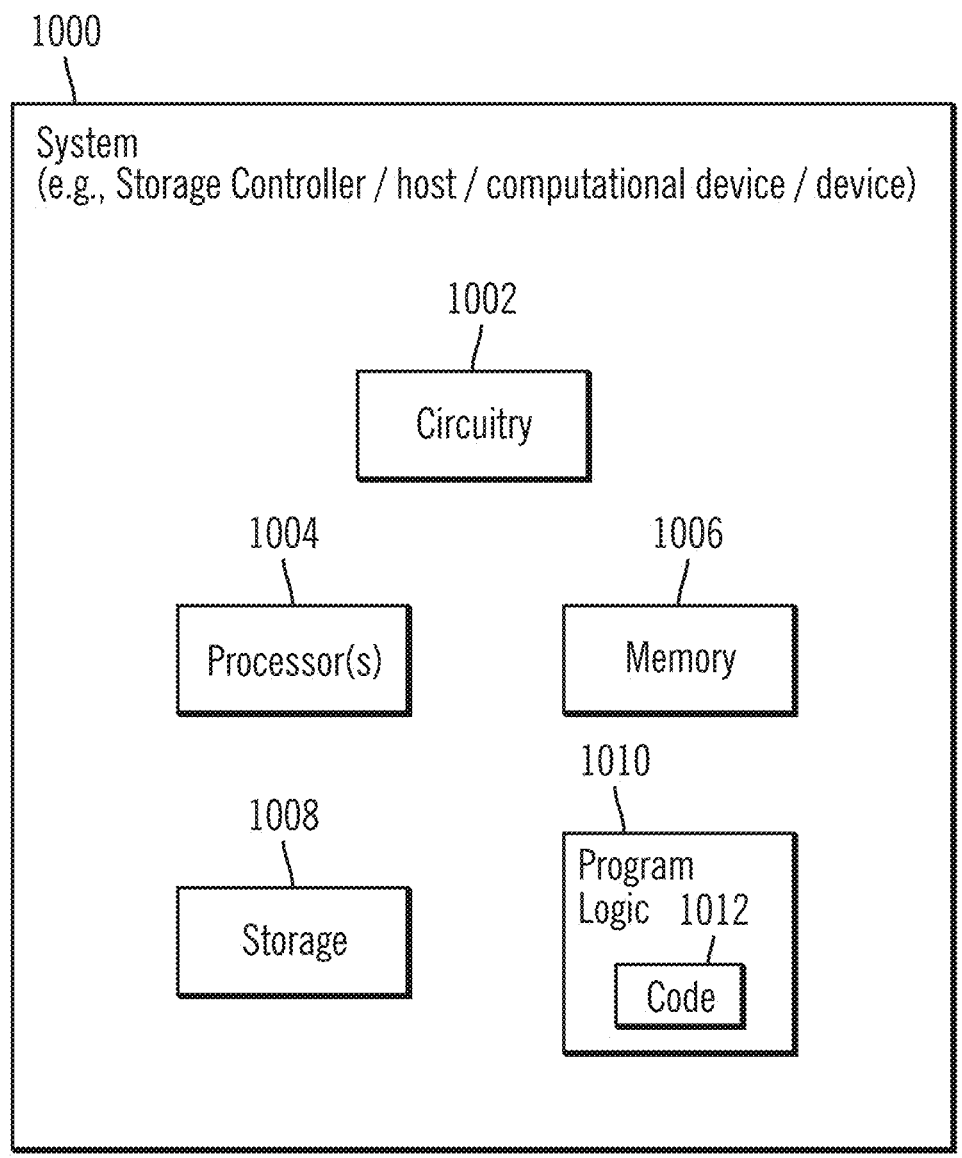
FIG. 10 illustrates a block diagram of a computational system that shows certain elements that may be included in the storage controller or the host shown in FIG. 1, in accordance with certain embodiments.

FIG. 10 illustrates a block diagram that shows certain elements that may be included in the host 104 or storage controller 102 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended affiliates.

What is claimed is:

1. A method, comprising:
maintaining, by a storage controller, an allocation space for extent space efficient storage volumes, wherein an extent pool is configured to allocate available extents to a first host application;
in response to a request from the first host application to delete data stored in selected extents that are already allocated to the first host application, deleting the data but continuing to maintain the selected extents as being allocated to the first host application; and
subsequent to continuing to maintain the selected extents as being allocated to the first host application and in response to determining that extents available in the extent pool have fallen below a threshold number for a second host application, releasing one or more of the selected extents from the allocation space of the first host application to add to the extent pool, wherein the one or more of the selected extents are not storing valid data.

2. The method of claim 1, wherein the selected extents were previously allocated to the first host application, in response to a previous request from the first host application to write the data whose deletion is being requested.

3. The method of claim 1, the method further comprising:
receiving a request to write additional new data;
determining that an adequate number of allocated extents are unavailable for writing the additional new data; and
allocating additional extents from the extent pool to the first host application, to write the additional new data.

4. The method of claim 1, the method further comprising:
in response to receiving an additional write request from the first host application, already allocated extents that have deleted data but that have not yet been returned to the extent pool are reused for writing data corresponding to the additional write request from the first host application.

5. The method of claim 4, wherein subsequent to writing the data, valid data is stored in the already allocated extents that are reused for writing the data.

6. The method of claim 1, the method further comprising:
in response to determining that a predetermined period of time has elapsed since the data was deleted, releasing the selected extents to add to the extent pool.

7. A system coupled to a host that executes a first host application, the system comprising:
a memory; and
a processor coupled to the memory, wherein the processor performs operations, the operations comprising:
maintaining an allocation space for extent space efficient storage volumes, wherein an extent pool is configured to allocate available extents to the first host application;
in response to a request from the first host application to delete data stored in selected extents that are already allocated to the first host application, deleting the data but continuing to maintain the selected extents as being allocated to the first host application; and
subsequent to continuing to maintain the selected extents as being allocated to the first host application and in response to determining that extents available in the extent pool have fallen below a threshold number for a second host application, releasing one or more of the selected extents from the allocation space of the first host application to add to the extent pool, wherein the one or more of the selected extents are not storing valid data.

8. The system of claim 7, wherein the selected extents were previously allocated to the first host application, in response to a previous request from the first host application to write the data whose deletion is being requested.

9. The system of claim 7, the operations further comprising:
receiving a request to write additional new data;
determining that an adequate number of allocated extents are unavailable for writing the additional new data; and
allocating additional extents from the extent pool to the first host application, to write the additional new data.

10. The system of claim 7, the operations further comprising:
in response to receiving an additional write request from the first host application, already allocated extents that have deleted data but that have not yet been returned to the extent pool are reused for writing data corresponding to the additional write request from the first host application.

11. The system of claim 10, wherein subsequent to writing the data, valid data is stored in the already allocated extents that are reused for writing the data.

12. The system of claim 7, the operations further comprising:

in response to determining that a predetermined period of time has elapsed since the data was deleted, releasing the selected extents to add to the extent pool.

13. A computer program product, the computer program product comprising:
a computer readable storage medium having computer readable program code embodied therewith, the computer readable program code configured to perform operations on a processor, the operations comprising:
maintaining, by a storage controller, an allocation space for extent space efficient storage volumes, wherein an extent pool is configured to allocate available extents to a first host application;
in response to a request from the first host application to delete data stored in selected extents that are already allocated to the first host application, deleting the data but continuing to maintain the selected extents as being allocated to the first host application; and
subsequent to continuing to maintain the selected extents as being allocated to the first host application and in response to determining that extents available in the extent pool have fallen below a threshold number for a second host application, releasing one or more of the selected extents from the allocation space of the first host application to add to the extent pool, wherein the one or more of the selected extents are not storing valid data.

14. The computer program product of claim 13, wherein the selected extents were previously allocated to the first host application, in response to a previous request from the first host application to write the data whose deletion is being requested.

15. The computer program product of claim 13, the operations further comprising:
receiving a request to write additional new data;
determining that an adequate number of allocated extents are unavailable for writing the additional new data; and
allocating additional extents from the extent pool to the first host application, to write the additional new data.

16. The computer program product of claim 13, the operations further comprising:
in response to receiving an additional write request from the first host application, already allocated extents that have deleted data but that have not yet been returned to the extent pool are reused for writing data corresponding to the additional write request from the first host application.

17. The computer program product of claim 16, wherein subsequent to writing the data, valid data is stored in the already allocated extents that are reused for writing the data.

18. The computer program product of claim 13, the operations further comprising:
in response to determining that a predetermined period of time has elapsed since the data was deleted, releasing the selected extents to add to the extent pool.

* * * * *